United States Patent
Chang et al.

(10) Patent No.: US 10,947,838 B2
(45) Date of Patent: Mar. 16, 2021

(54) ECHO VELOCITY MEASUREMENTS WITHOUT USING RECESSED ULTRASONIC TRANSCEIVER

(71) Applicant: Halliburton Energy Services, Inc., Houston, TX (US)

(72) Inventors: Chung Chang, Houston, TX (US); Yu Weng, Kingwood, TX (US); Peng Li, Houston, TX (US); Ziyang Li, Spring, TX (US); Rodney Marlow, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/582,847

(22) Filed: Sep. 25, 2019

(65) Prior Publication Data
US 2020/0116012 A1  Apr. 16, 2020

Related U.S. Application Data

(60) Provisional application No. 62/746,457, filed on Oct. 16, 2018.

(51) Int. Cl.
*E21B 47/085*  (2012.01)
*E21B 47/01*  (2012.01)
*G01P 5/24*  (2006.01)

(52) U.S. Cl.
CPC .......... *E21B 47/085* (2020.05); *E21B 47/01* (2013.01); *G01P 5/241* (2013.01)

(58) Field of Classification Search
CPC ....... E21B 47/01; E21B 47/013; E21B 47/085
See application file for complete search history.

(56) References Cited

U.S. PATENT DOCUMENTS

| 6,618,322 | B1 | 9/2003 | Georgi |
| 6,829,947 | B2 | 12/2004 | Han et al. |
| 9,366,133 | B2 | 6/2016 | DiFoggio et al. |
| 2005/0152219 | A1 | 7/2005 | Garcia-Osuna et al. |
| 2015/0369037 | A1 | 12/2015 | Jones |
| 2016/0032717 | A1 | 2/2016 | Parker |
| 2017/0102481 | A1 | 4/2017 | Segura et al. |
| 2017/0115423 | A1 | 4/2017 | Hori et al. |

OTHER PUBLICATIONS

International Search Report and Written Opinion for Application No. PCT/US2019/053579, dated Jan. 17, 2020.
Halliburton, Sperry Drilling, XBAT™ Plus Azimuthal Sonic and Ultrasonic LWD Service, H013097, May 2019.
Halliburton, Xaminer Sonic Imager Service, H011818, Nov. 2018.

*Primary Examiner* — Kristyn A Hall
(74) *Attorney, Agent, or Firm* — Benjamin Ford; C. Tumey Law Group PLLC (57) ABSTRACT

A system for determining a borehole shape may comprise a measurement assembly, wherein the measurement assembly may comprise a housing with an outer surface, a transducer disposed flush along the outer surface of the housing, and an extruded boss that connects to the outer surface of the housing. A method may comprise disposing a downhole tool that includes an instrument section into a wellbore and transmitting an excitation from the transducer into the wellbore, wherein the excitation is reflected off a wellbore wall as an echo.

20 Claims, 6 Drawing Sheets

(12) United States Patent
US 10,947,838 B2

ECHO VELOCITY MEASUREMENTS WITHOUT USING RECESSED ULTRASONIC TRANSCEIVER

BACKGROUND

Wellbores drilled into subterranean formations may enable recovery of desirable fluids (e.g., hydrocarbons) using any number of different techniques. Currently, drilling operations may identify subterranean formations through a bottom hole assembly if the subterranean formation is disposed horizontal to the bottom hole assembly. In measurement operations, a measurement assembly may operate and/or function to determine the shape of a borehole.

Traditional engineering solutions using at least one recessed transceiver and the travel time differences between pairs of receivers to determine the shape of the borehole. When measuring travel time, the mud speed may be an important factor. Currently engineered measurement systems often comprise small gauge distances between transceivers, which may make the measured difference in travel time at each transceiver too small. This limitation may make it difficult to derive accurate mud speeds. In addition, for imaging application all transceivers may be located at the same radius distance to avoid additional sensitivity correction introduced by a recessed transceiver. It may be desirable to manufacture measure mud speed without implementing recessed transceivers as well as to increase the gauge length aimed to obtain higher accuracy in situ mud speed measurements.

BRIEF DESCRIPTION OF THE DRAWINGS

These drawings illustrate certain aspects of some examples of the present disclosure, and should not be used to limit or define the disclosure.

DETAILED DESCRIPTION

This disclosure may generally relate to downhole tools and, more particularly, to a bottom hole assembly measurement system configured for borehole imaging to derive the shape of a borehole from multiple transceiver measurements, which may be used to feedback and further refine mud speed measurements where statistical or stochastic answers may be appropriate and accurate. Because the mud speed will not change in a few feet of depth, frequent measurement is not necessary at different depths. Therefore, imaging quality may be more uniform across all transceivers, which may enable more accurate borehole shape and imaging as well as mud speed measurements, which may be used by other measurement tools and products that require accurate borehole shape and mud speed measurements.

Figure 1:
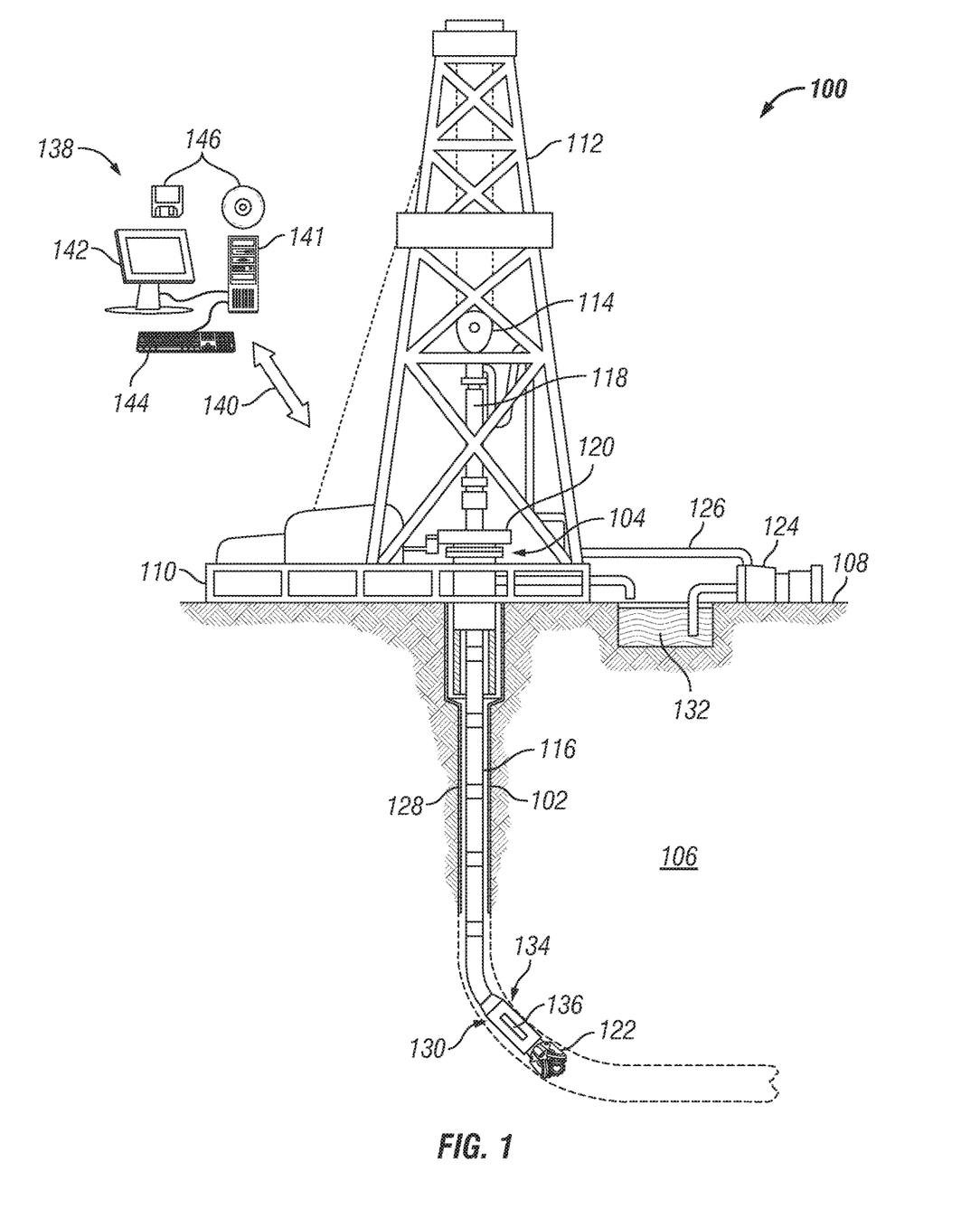
FIG. 1 illustrates an example of a drilling system.

FIG. 1 illustrates an example of a drilling system 100. As illustrated, wellbore 102 may extend from a wellhead 104 into a subterranean formation 106 from a surface 108. Generally, wellbore 102 may include horizontal, vertical, slanted, curved, and other types of wellbore geometries and orientations. Wellbore 102 may be cased or uncased. In examples, wellbore 102 may include a metallic member. By way of example, the metallic member may be a casing, liner, tubing, or other elongated steel tubular disposed in wellbore 102.

As illustrated, wellbore 102 may extend through subterranean formation 106. As illustrated in FIG. 1, wellbore 102 may extend generally vertically into subterranean formation 106, however wellbore 102 may extend at an angle through subterranean formation 106, such as horizontal and slanted wellbores. For example, although FIG. 1 illustrates a vertical or low inclination angle well, high inclination angle or horizontal placement of the well and equipment may be possible. It should further be noted that while FIG. 1 generally depicts land-based operations, those skilled in the art may recognize that the principles described herein are equally applicable to subsea operations that employ floating or sea-based platforms and rigs, without departing from the scope of the disclosure.

As illustrated, a drilling platform 110 may support a derrick 112 having a traveling block 114 for raising and lowering drill string 116. Drill string 116 may include, but is not limited to, drill pipe and coiled tubing, as generally known to those skilled in the art. A kelly 118 may support drill string 116 as it may be lowered through a rotary table 120. A drill bit 122 may be attached to the distal end of drill string 116 and may be driven either by a downhole motor and/or via rotation of drill string 116 from surface 108. Without limitation, drill bit 122 may include, roller cone bits, PDC bits, natural diamond bits, any hole openers, reamers, coring bits, and the like. As drill bit 122 rotates, it may create and extend wellbore 102 that penetrates various subterranean formations 106. A pump 124 may circulate drilling fluid through a feed pipe 126 through kelly 118, downhole through interior of drill string 116, through orifices in drill bit 122, back to surface 108 via annulus 128 surrounding drill string 116, and into a retention pit 132.

With continued reference to FIG. 1, drill string 116 may begin at wellhead 104 and may traverse wellbore 102. Drill bit 122 may be attached to a distal end of drill string 116 and may be driven, for example, either by a downhole motor and/or via rotation of drill string 116 from surface 108. Drill bit 122 may be a part of bottom hole assembly 130 at a distal end of drill string 116. Bottom hole assembly 130 may further include tools for look-ahead resistivity applications. As will be appreciated by those of ordinary skill in the art, bottom hole assembly 130 may be a measurement-while drilling (MWD) or logging-while-drilling (LWD) system.

Bottom hole assembly 130 may comprise any number of tools, transmitters, and/or receivers to perform downhole measurement operations. For example, as illustrated in FIG. 1, bottom hole assembly 130 may include a measurement assembly 134. It should be noted that measurement assembly 134 may make up at least a part of bottom hole assembly 130. Without limitation, any number of different measurement assemblies, communication assemblies, battery assemblies, and/or the like may form bottom hole assembly 130 with measurement assembly 134. Additionally, measurement assembly 134 may form bottom hole assembly 130 itself. In examples, measurement assembly 134 may comprise at least one transducer 136, which may be disposed at the surface of measurement assembly 134 or be disposed within measurement assembly 134. Without limitation, there may be four transducers 136 that may be disposed ninety degrees from each other. However, it should be noted that there may be any number of transducers 136 disposed along bottom hole assembly 130 at any degree from each other. In examples, transducers 136 may be made of piezo-ceramic crystals, or optionally magnetostrictive materials or other materials that generate an acoustic pulse when activated electrically or otherwise. In examples, transducers 136 may also include backing materials and matching layers. It should be noted that transducers 136 and assemblies housing transducers 136 may be removable and replaceable, for example, in the event of damage or failure. Transducers 136 may function and operate to generate an acoustic excitation that travels through borehole fluids. In examples, transducers 136 may further sense and acquire the reflected pressure wave, which is modulated (i.e., reflected as an echo) by the borehole wall. During measurement operations, the travel time of the pulse wave from transmission to recording of the echo may be recorded. This information may lead to determining a radius of the borehole, which may be derived by the fluid sound speed. By analyzing the amplitude of the echo signal, the acoustic impedance may also be derived.

Without limitation, bottom hole assembly 130 may be connected to and/or controlled by information handling system 138, which may be disposed on surface 108. Without limitation, information handling system 138 may be disposed in bottom hole assembly 130. Processing of information recorded may occur down hole and/or on surface 108. Processing occurring downhole may be transmitted to surface 108 to be recorded, observed, and/or further analyzed. Additionally, information recorded on information handling system 138 that may be disposed down hole may be stored until bottom hole assembly 130 may be brought to surface 108. In examples, information handling system 138 may communicate with bottom hole assembly 130 through a communication line (not illustrated) disposed in (or on) drill string 116. In examples, wireless communication may be used to transmit information back and forth between information handling system 138 and bottom hole assembly 130. Information handling system 138 may transmit information to bottom hole assembly 130 and may receive as well as process information recorded by bottom hole assembly 130. In examples, a downhole information handling system (not illustrated) may include, without limitation, a microprocessor or other suitable circuitry, for estimating, receiving and processing signals from bottom hole assembly 130. Downhole information handling system (not illustrated) may further include additional components, such as memory, input/output devices, interfaces, and the like. In examples, while not illustrated, bottom hole assembly 130 may include one or more additional components, such as analog-to-digital converter, filter, and amplifier, among others, that may be used to process the measurements of bottom hole assembly 130 before they may be transmitted to surface 108. Alternatively, raw measurements from bottom hole assembly 130 may be transmitted to surface 108.

Any suitable technique may be used for transmitting signals from bottom hole assembly 130 to surface 108, including, but not limited to, wired pipe telemetry, mud-pulse telemetry, acoustic telemetry, and electromagnetic telemetry. While not illustrated, bottom hole assembly 130 may include a telemetry subassembly that may transmit telemetry data to surface 108. At surface 108, pressure transducers (not shown) may convert the pressure signal into electrical signals for a digitizer (not illustrated). The digitizer may supply a digital form of the telemetry signals to information handling system 138 via a communication link 140, which may be a wired or wireless link. The telemetry data may be analyzed and processed by information handling system 138.

As illustrated, communication link 140 (which may be wired or wireless, for example) may be provided. It may transmit data from bottom hole assembly 130 to an information handling system 138 at surface 108. Information handling system 138 may include a personal computer 141, a video display 142, a keyboard 144 (i.e., other input devices), and/or non-transitory computer-readable media 146 (e.g., optical disks, magnetic disks) that may store code representative of the methods described herein. In addition to, or in place of processing at surface 108, processing may also occur downhole.

As discussed below, methods may be utilized by information handling system 138 to determine properties of subterranean formation 106. Information may be utilized to produce an image, which may be generated into a two- or three-dimensional models of subterranean formation 106. These models may be used for well planning, (e.g., to design a desired path of wellbore 102). Additionally, they may be used for planning the placement of drilling systems within a prescribed area. This may allow for the most efficient drilling operations to reach a subsurface structure. During drilling operations, measurements taken within wellbore 102 may be used to adjust the geometry of wellbore 102 in real time to reach a geological target. Measurements collected from bottom hole assembly 130 of the formation properties may be used to steer drilling system 100 toward a subterranean formation 106.

Figure 2:
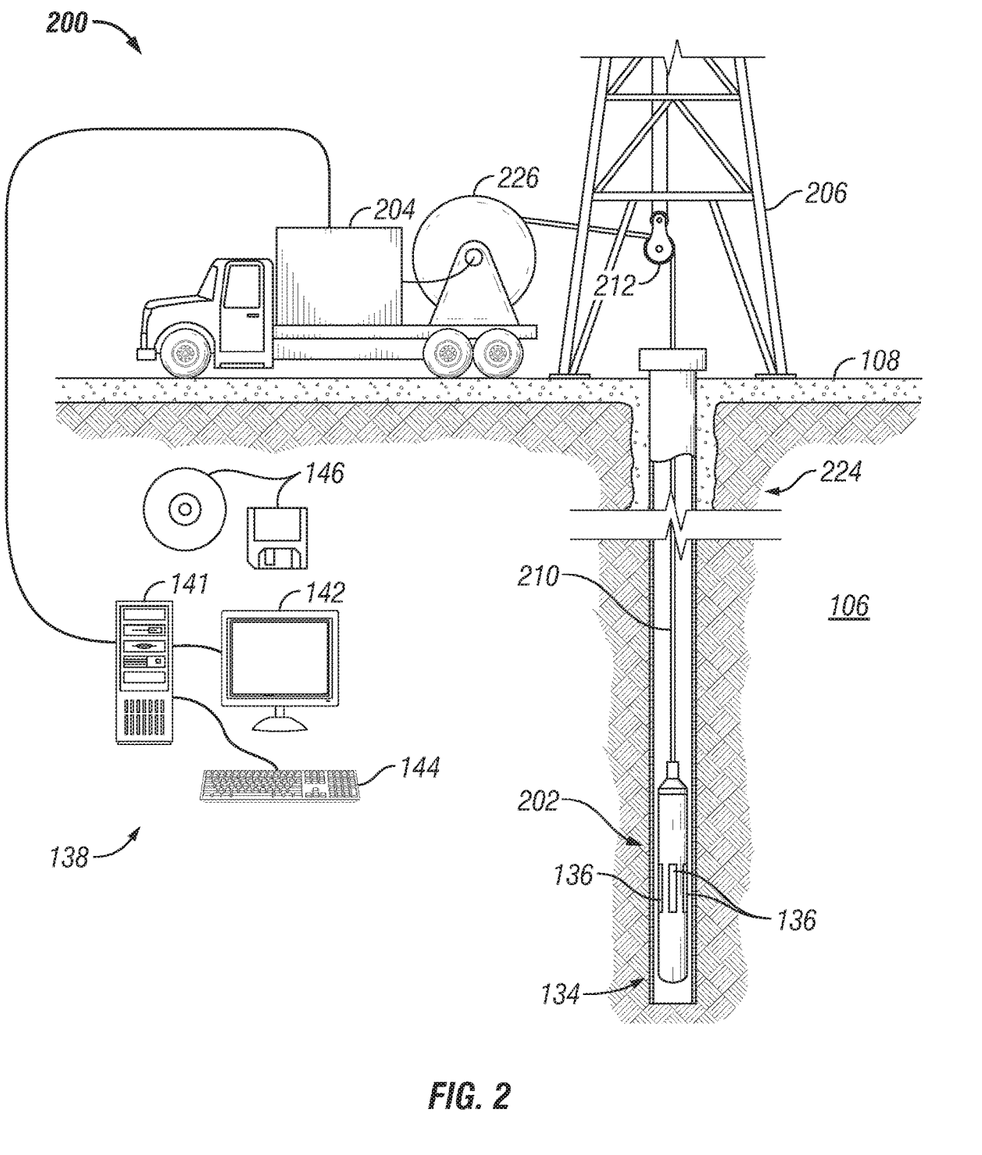
FIG. 2 illustrates an example of a well measurement system.

FIG. 2 illustrates a cross-sectional view of an example of well measurement system 200. As illustrated, well measurement system 200 may comprise downhole tool 202 attached a vehicle 204. In examples, it should be noted that downhole tool 202 may not be attached to a vehicle 204. Downhole tool 202 may be supported by rig 206 at surface 108. Downhole tool 202 may be tethered to vehicle 204 through conveyance 210. Conveyance 210 may be disposed around one or more sheave wheels 212 to vehicle 204. Conveyance 210 may include any suitable means for providing mechanical conveyance for downhole tool 202, including, but not limited to, wireline, slickline, coiled tubing, pipe, drill pipe, downhole tractor, or the like. Conveyance 210 may provide mechanical suspension, as well as electrical and/or optical connectivity, for downhole tool 202. Conveyance 210 may comprise, in some instances, a plurality of electrical conductors and/or a plurality of optical conductors extending from vehicle 204, which may provide power and telemetry. In examples, an optical conductor may utilize a battery and/or a photo conductor to harvest optical power transmitted from surface 108. Conveyance 210 may comprise an inner core of seven electrical conductors covered by an insulating wrap. An inner and outer steel armor sheath may be wrapped in a helix in opposite directions around the conductors. The electrical and/or optical conductors may be used for communicating power and telemetry between vehicle 204 and downhole tool 202. Information from downhole tool 202 may be gathered and/or processed by information handling system 138. For example, signals recorded by downhole tool 202 may be stored in memory and then processed by downhole tool 202. The processing may be performed real-time during data acquisition or after recovery of downhole tool 202. Processing may alternatively occur downhole or may occur both downhole and at surface. In examples, signals recorded by downhole tool 202 may be communicated to information handling system 138 by way of conveyance 210. Information handling system 138 may process the signals, and the information contained therein may be displayed for an operator to observe and be stored for future processing and reference. Information handling system 138 may also contain an apparatus for supplying control signals and power to downhole tool 202.

Systems and methods of the present disclosure may be implemented, at least in part, with information handling system 138. While shown at surface 108, information handling system 138 may also be located at another location, such as remote from borehole 224. Information handling system 138 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system 138 may be a personal computer 141, a network storage device, or any other suitable device and may vary in size, shape, performance, functionality, and price. Information handling system 138 may include random access memory (RAM), one or more processing resources such as a central processing unit (CPU) or hardware or software control logic, ROM, and/or other types of nonvolatile memory. Additional components of the information handling system 138 may include one or more disk drives, one or more network ports for communication with external devices as well as various input and output (I/O) devices, such as a keyboard 144, a mouse, and a video display 142. Information handling system 138 may also include one or more buses operable to transmit communications between the various hardware components. Furthermore, video display 142 may provide an image to a user based on activities performed by personal computer 141. For example, producing images of geological structures created from recorded signals. By way of example, a video display unit may produce a plot of depth versus the two cross-axial components of the gravitational field and versus the axial component in borehole coordinates. The same plot may be produced in coordinates fixed to the Earth, such as coordinates directed to the North, East and directly downhole (Vertical) from the point of entry to the borehole. A plot of overall (average) density versus depth in borehole or vertical coordinates may also be provided. A plot of density versus distance and direction from the borehole versus vertical depth may be provided. It should be understood that many other types of plots are possible when the actual position of the measurement point in North, East and Vertical coordinates is taken into account. Additionally, hard copies of the plots may be produced in paper logs for further use.

Alternatively, systems and methods of the present disclosure may be implemented, at least in part, with non-transitory computer-readable media 146. Non-transitory computer-readable media 146 may include any instrumentality or aggregation of instrumentalities that may retain data and/or instructions for a period of time. Non-transitory computer-readable media 146 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

In examples, rig 206 includes a load cell (not shown), which may determine the amount of pull on conveyance 210 at the surface of borehole 224. Information handling system 138 may comprise a safety valve (not illustrated) which controls the hydraulic pressure that drives drum 226 on vehicle 204, which may reel up and/or release conveyance 210 which may move downhole tool 202 up and/or down borehole 224. The safety valve may be adjusted to a pressure such that drum 226 may only impart a small amount of tension to conveyance 210 over and above the tension necessary to retrieve conveyance 210 and/or downhole tool 202 from borehole 224. The safety valve is typically set a few hundred pounds above the amount of desired safe pull on conveyance 210 such that once that limit is exceeded, further pull on conveyance 210 may be prevented.

As illustrated in FIG. 2, downhole tool 202 may include measurement assembly 134. It should be noted that measurement assembly 134 may make up at least a part of downhole tool 202. Without limitation, any number of different measurement assemblies, communication assemblies, battery assemblies, and/or the like may form downhole tool 202 with measurement assembly 134. Additionally, measurement assembly 134 may form downhole tool 202 itself. In examples, measurement assembly 134 may include any number of transducers 136, which may be disposed at or near the surface of measurement assembly 134. Without limitation, there may be four transducers 136 that may be disposed ninety degrees from each other. However, it should be noted that there may be any number of transducers 136 disposed along bottom hole assembly 130 at any degree from each other.

Figure 3:
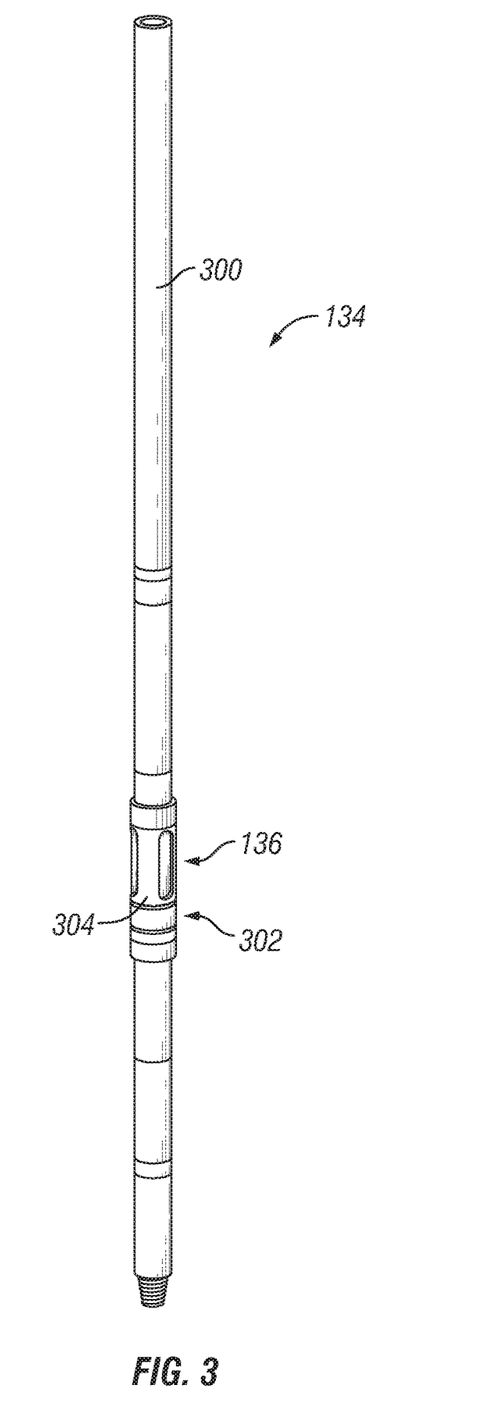
FIG. 3 illustrates an example of a measurement assembly.

FIG. 3 illustrates a close-up view of an example of measurement assembly 134. In some examples, instrument section 302 may house four of the transducers 136 spaced around the circumference of the instrument section 302. However, embodiments may include more or less than four of the transducers 136. As illustrated, measurement assembly 134 may include at least one battery section 300 and at least one instrument section 302. Battery section 300 may operate and function to enclose and/or protect at least one battery that may be disposed in battery section 300. Without limitation, battery section 300 may also operate and function to power measurement assembly 134. Specifically, battery section 300 may power at least one transducer 136, which may be disposed at any end of battery section 300 in instrument section 302.

Instrument section 302 may include a housing 304 in which at least one transducer 136 may be disposed. In examples, each transducer 136 may be recessed within housing 304. This may afford transducer 136 with protection from the elements within wellbore 102. Transducers 136 may function and operate to generate and record excitations within a borehole. For example, during operations, transducer 136 may transmit an excitation into wellbore 102 (e.g., referring to FIG. 1). Without limitation, the excitation may be in the form of a pressure pulse, current, electromagnetic field, radio frequency, and/or any other suitable medium. This may allow for transducer 136 to be an ultrasonic device, acoustic device, electromagnetic device, radio frequency device, and/or the like. In examples, may be made of piezo-ceramic crystals, or optionally magnetostrictive materials or other materials that generate an acoustic pulse when activated electrically or otherwise. In one or more examples, transducers 136 may also include backing materials and matching layers. Additionally, transducer 136 may include coils, antennas, and/or the like. It should be noted that transducers 136 and/or instrument section 302 may be removable and replaceable, for example, in the event of damage or failure.

During operations, in examples where transducer 136 may emit a pressure wave, specifically an ultrasonic pressure pulse wave, the pressure pulse may have a frequency range, for example, from about 50 kHz to about 500 kHz. In some examples, the center of the frequency range may be around 250 kHz. It should be noted that the pulse signal may be emitted with different frequency content. Recordings and/or measurements taken by transducer 136 may be transmitted to information handling system 138 by any suitable means, as discussed above. Transmission may be performed in real-time (transmitted to the surface via mud-pulse, wired-pipe or other telemetry) or post-drill (from data stored in the tool memory and recovered at the surface during tripping).

In examples, transducers 136 may further sense and record the transmission of the excitation. The excitation may travel from transducer 136 and reflect off a borehole wall. The reflected excitation is defined as an echo, which is recorded by transducer 136. Without limitation, transducers 136 may measure the excitation as it travels from transducer 136 and is reflected back to transducer 136 as an echo.

In examples, the amplitude of the echo may be recorded and/or measured to determine the shape of a borehole. Identifying, measuring, and recording a maximum echo amplitude may also provide an accurate determination of travel time as well as the echo amplitude to generate high quality hole shape and imaging measurements. Travel time may be defined as the amount of time an excitation may travel to a borehole wall, reflect off the borehole wall as an echo, and the echo is received by transducer 136. To determine the borehole wall offset distance (e.g., distance from measuring assembly 134 to the borehole wall), an accurate mud speed value may be identified as the distance from the measuring assembly 134 to the borehole wall, which may be a half of a product of echo travel time and mud speed. It should be noted that mud speed may change with pressure and temperature. Therefore, surface mud speed measurements may not be the same as downhole in-situ mud speed measurements. In examples, a separate mud speed measurement system may be utilized with measurement assembly 134 downhole to further increase the accuracy of mud speed measurements. However, mud speed may not change in depth of feet and a refreshed measurement may not be found at each depth.

In examples, a traditional mud speed measurement may be implemented by a transducer 136 that is recessed. Both high quality borehole shape measurement and imaging measurements may operate with fine pixel spatial coverage. Since tool rotating speed may not be controlled, more azimuthal transceivers may be implemented to increase the measurement pixel spatial coverages. This may prevent increasing backing attenuation material length in order to reduce transducers ringdown amplitude, which may create a dead time window for echo measurements. Ringdown is the vibration of transducer 136 after a transmission of an excitation from transducer 136. Therefore, transducers 136 that are recessed may trade off the measurement quality. In addition, high quality images generated by multiple transceivers may not utilize additional amplitude correction in order to deliver more uniform image quality across all images generated by different transducers 136. Thus, without a recessed transceiver, it may be easier to combine images.

As the target distance is unknown for mud speed measurement, a recessed transducer may utilize a second transducer offset at different distance either aligned in the same direction or at the opposite direction of the first recessed transducer. If the second transducer is aligned in the same direction, it may be physically offset axially above or below at an engineering feasible distance and assumes that both transducers may illuminate the same target of the same distance, which may be provided for a small vertical offset. Additionally, to overcome the mud built up at the face of a recessed transducer a mud extruder may be disposed within the transducer, which may further complicate echo arrival time calculations. As discussed above, to build a robust ultrasonic caliper/imaging measurement system may include, longer backing length to attenuate ringdown, larger recessed distance for accurate mud speed measurement which may prevent echoes from falling within a dead time window, transducer 136 closer to the borehole wall for capturing larger echo amplitude, a reduction in recesses to eliminate uniform image corrections, and removal of mud extruders.

Figure 4A:
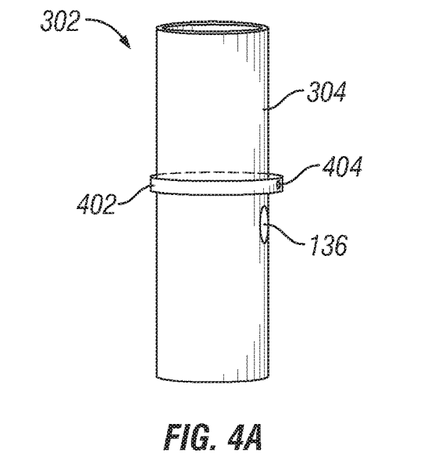
FIG. 4A illustrates an example of a side view of an extruded boss.
Figure 4B:
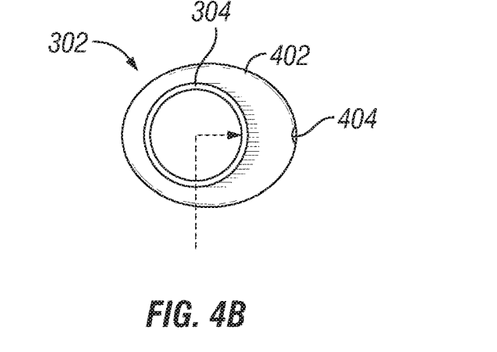
FIG. 4B illustrates an example of a top view of the extruded boss.

FIGS. 4A and 4B illustrate an example of an instrument section 302 in which an extruded boss 402 is connected to the outer surface of housing 304. As discussed above, one or more transducers 136 may be typically recessed within housing 304 to protect transducers 136 from elements within wellbore 102. Recessing transducers 136 within housing 304 may create spacing issues, measurement problems, and imaging issues. For example, recessing transducers 136 within housing 304 may reduce the distance from the center of housing 304 to transducer 136. This may reduce the amount of backing attenuation material, not illustrated, in which transducer 136 may be connected to. Reduction of attenuation material may not allow for, prevent, or reduce the effectiveness of the attenuation material to attenuate the amplitude of transducer ringdown. Additionally, the reduction in distance may result in back reflected echoes from the middle of instrument section 302. Back reflected echoes may propagate a shorter distance with a smaller travel time, which may overlap with the reflected echoes from the borehole wall, thus effectively hiding the reflected echoes for measurement operations. While recessing transducers 136 within housing 304 may protect each transducer 136, it may also allow for mud to accumulate in the space from the outer surface of housing 304 to transducer 136. Accumulation of mud within this space may alter path of excitations transmitted from transducer 136 as well as alter paths of the reflected excitations to transducer 136. The accumulation of mud may also lead to mud erosion.

However, the used of extruded boss 402 may allow for each transducer 136 to be installed flush with the outer surface of housing 304, as extruded boss 402 may protect each transducer 136 from elements within wellbore 102 with an extruded boss 402 aligned geometrically to set a minimum distance against a borehole wall. Disposing transducer 136 flush with the outer surface of housing 304 may reduce mud erosion as mud accumulation with a transducer 136 that is recessed may not be present. Additionally, as transducer 136 is disposed flush to the outer surface of housing 304, it may be easier to generate and compensate images created from measurements taken during measurement operations. Mechanically, instrument section 302 may have increased torsional and bending mechanical strength as deeper recesses into housing 304 may not be needed to mount transducer 136 flush to the outer surface of housing 304.

In one or more examples, extruded boss 402 (or bosses) may be geometrically aligned with a chosen transducer axis along its sensing direction at a reasonable offset distance above or below to setup a minimum wall offset distance. In examples, extruded boss 402 may not be more than two feet (0.6 meter) axially above or below transducer 136 or axially less than about a quarter of an inch (0.006 meter) from transducer 136. Additionally, extruded boss 402 may be about no less than about a quarter of an inch (0.006 meter) from the outer surface of housing 304 to the further extension point of extruded boss 402 and no more than the radius of wellbore 102. In examples, a larger gauge length may ensure more accurate mud speed measurement derived from the echo travel time. Without limitation, the shape of extruded boss 402 may be spiral, oval, circular, triangular, and/or any combination thereof.

In examples, with continued reference to FIGS. 4A and 4B, at least one sensor 404 may be attached to, disposed on, or connected to the extruded boss 402. Without limitation, the at least one sensor 404 may be configured to detect contact between the at least one sensor 404 and a wall of a borehole. Both the extruded boss 402 and sensor 404 may help in determining echo travel time. While bottom hole assembly 130 (e.g., referring to FIG. 3) may be rotating, the minimum echo travel time may be statistically found. This travel time value may then be used to derive the in-situ mud speed. In examples, the maximum radii of the extrusion with the transducer axis may be aligned azimuthally.

Figure 5A:
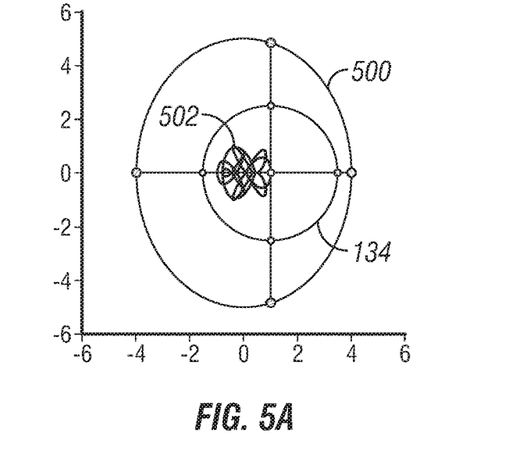
FIG. 5A is a graph of the motion of a measurement assembly.
Figure 5B:
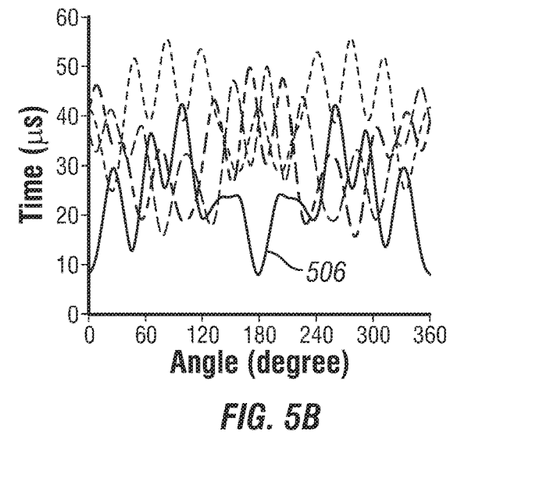
FIG. 5B is a graph of echo arrival time compared to the angle of a transceiver.

FIG. 5A shows an example diagram showing an elliptical borehole 500 and a measurement assembly 134 at its rotational starting position. During motion, the trajectory of the center position of measurement assembly 134 may be identified by path 502 during downhole operations. Knowing the true center position of measurement assembly 134 may be beneficial in determining mud speed. Theoretically, the minimum distance that a transducer 136 that is recessed (e.g., referring to FIG. 3) may measure is the recessed distance, if transducer 136 is normal incident to the borehole wall, which means the borehole wall offset distance is zero between instrument section 302 (e.g., referring to FIG. 3) and the borehole wall. Given the minimum distance against a borehole wall and corresponding travel time, mud speed may be readily calculated by:

$$v_{mud} = \frac{D_{min}}{\frac{T_{min}}{2}}, \quad (1)$$

where $D_{min}$ is the minimum distance, which may be equal to the recessed distance, and $T_{min}$ is the corresponding minimum echo travel time of the transducer 136 that is recessed. In practice, however, variations in both distance and time lead to inaccuracy of the mud speed, which may be improved by statistically analyzing the minimum travel time combined with the obtained borehole shape and trajectory of the center of the measurement assembly in depth of feet or meter under the assumption that mud speed may not change. Some traditional statistical methods may be used to analyze such as average and standard deviation of travel time. FIG. 5B is a graph of simulated data that plots the arrival time of an echo at four different transducers 136 (e.g., referring to FIG. 1), and plot 506 may be from the one of the transducers 136 aligned with extruded boss 402 (e.g., referring to FIGS. 4A and 4B). The minimum travel time may be observed at 0 and 180 degrees. Different echo arrival time versus angle may be due to rotation of measurement assembly 134 and its center motions, as illustrated in FIG. 5A. The minimum travel time corresponding to a particular transducer 136 (e.g., referring to FIG. 1) may be used to calculate the mud speed according to its predicted borehole wall offset.

Figure 6:
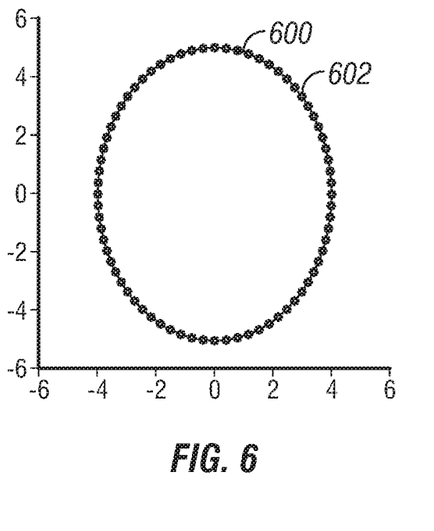
FIG. 6 illustrates an example of a top view of a borehole.

FIG. 6 illustrates an elliptical hole shape of borehole 600 inverted from four transducer measurements and may be over plotted with the original hole shape 602. Since mud speed measurement are not found at each depth, borehole caliper and imaging measurements may be used congruently to identify borehole sections with better hole shape qualities in order to confidently refine minimum echo travel time answers to reach an accurate mud speed answer.

Figure 7:
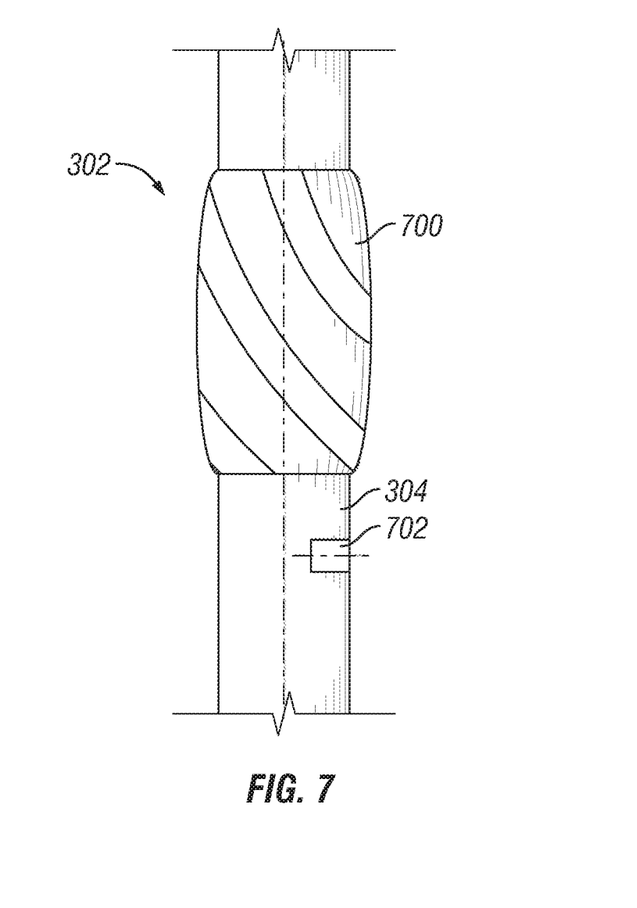
FIG. 7 illustrates an example of a stabilizer on the measurement assembly.

FIG. 7 illustrates an example of a stabilizer 700, which may be another example of an extruded boss 402 (e.g., referring got FIGS. 4A and 4B). In examples, stabilizer 700 may include channels 704, which may allow for mud and other external material to pass through stabilizer 700 as stabilizer 700 traverses through wellbore 102. Without limitation, stabilizer 700 may be installed above or below a transceiver 702 on an outer surface of instrument section 302. Additionally, stabilizer 700 may be installed no more than two feet (0.6 meters) from transceiver 702 or axially less than about a quarter of an inch (0.006 meters) from transducer 136. As discussed above, the same principle may be used to find the minimum travel time statistically or stochastically in order to derive the in situ mud speed and multiple mud speed measurements from all transceivers 702. Similarly, arranged transducers 136 (e.g., referring to FIG. 1) and their corresponding minimum echo travel time may be combined together to arrive at an appropriate mud speed answer. The minimum offset may be defined by the high point in the waist of stabilizer 700 and its perpendicular distance to outer surface of instrument section 302. Stabilizer 700, much like extruded boss 402 may allow for transceiver to mounted flush to outer surface of instrument section 302.

Figure 8:
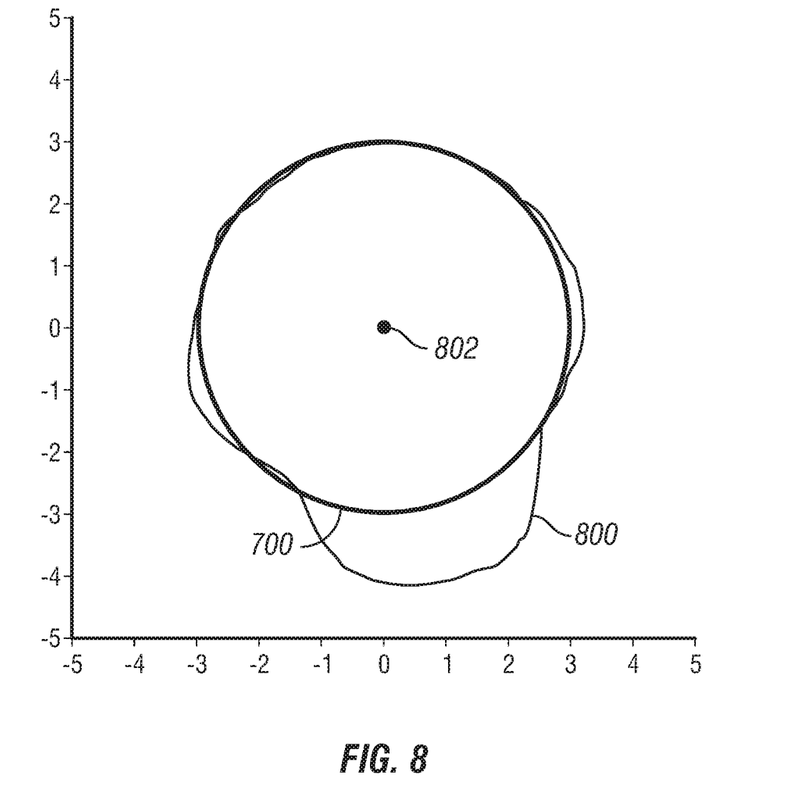
FIG. 8 illustrates a graph of a borehole shape at a specific depth recalculated by using an estimated mud speed calculation.

FIG. 8 shows a graph of a borehole shape 800 at a specific depth recalculated by using the new estimated mud speed, which is obtained by the minimum offset distance (i.e., from transducer 136 to stabilizer 700) divided by the minimum echo travel time. Stabilizer 700 may have a known shape and size which may not change during drilling operations. However, the location of stabilizer 700 is changing as depth increases during drilling operations. Here, center 802 of instrument section 302 (e.g., referring to FIG. 3) may be used as center 802 of the stabilizer 700. However, the vertical distance offset between stabilizer 700 and instrument section 302 may be taken into account. Here, stabilizer 700 is 2 feet (0.6 meters) below transducers 136. Therefore, center 802 of stabilizer 700 is same as the center of instrument section 302 at 2 feet (0.6 meters) above the selected depth shown in FIG. 8. In addition, the selected depth (rotation) in FIG. 8 corresponds to a minimum echo travel time that may occur and may be chosen for deriving the new mud speed. As shown in FIG. 8, most sections of stabilizer 700 may approach the wall of borehole 800 as shown with a new mud speed calculation, which means the distance from transducers 136 to borehole 800 is the distance from transducers 136 to stabilizer 700 (i.e., minimum offset distance), which may be further used as a verification process and plot to validate mud speed calculations as well as refine mud speed answers.

The systems and methods for a high protection and receiver saturation prevention apparatus within any suitable tool may include any of the various features of the systems and methods disclosed herein, including one or more of the following statements.

Statement 1: A system may comprise a measurement assembly, wherein the measurement assembly may comprise a housing with an outer surface, a transducer disposed flush along the outer surface of the housing, and an extruded boss that connects to the outer surface of the housing.

Statement 2. The system of statement 1, further comprising a sensor disposed on the extruded boss.

Statement 3. The system of statement 2, wherein the sensor is configured to detect contact between a wellbore wall and the sensor.

Statement 4. The system of statements 1 or 2, wherein the extruded boss is connected to the outer surface of the housing no more than two feet above the transducer.

Statement 5. The system of statement 4, wherein the extruded boss connects above the transducer.

Statement 6. The system of statement 4, wherein the extruded boss connects below the transducer.

Statement 7. The system of statements 1, 2, or 4, wherein the extruded boss extends at least a quarter-inch from the outer surface of the housing.

Statement 8. The system of statements 1, 2, 4, or 7, wherein the extruded boss is a stabilizer.

Statement 9. The system of statement 8, wherein the stabilizer includes one or more channels.

Statement 10. The system of statement 9, wherein the stabilizer is configured to center the measurement assembly in a wellbore.

Statement 11. A method may comprise disposing a downhole tool that includes an instrument section into a wellbore, wherein the instrument section may comprise a housing with an outer surface, a transducer disposed flush along the outer surface of the housing, and an extruded boss that connects to the outer surface of the housing. The method may further comprise transmitting an excitation from the transducer into the wellbore, wherein the excitation is reflected off a wellbore wall as an echo.

Statement 12. The method of statement 11 further comprising a sensor disposed on the extruded boss.

Statement 13. The method of statement 12, wherein the sensor is configured to detect contact between the wellbore wall and the sensor.

Statement 14. The method of statements 11 or 12, determining a mud speed with $$v_{mud} = \frac{D_{min}}{\frac{T_{min}}{2}},$$

wherein $D_{min}$ is a distance from the transducer to the wellbore wall and $T_{min}$ is an echo travel time.

Statement 15. The method of statements 11, 12, or 14, wherein the extruded boss is connected to the outer surface of the housing no more than two feet above the transducer.

Statement 16. The method of statement 15, wherein the extruded boss connects above the transducer or below the transducer.

Statement 17. The method of statements 11, 12, 14 or 15, wherein the extruded boss extends at least a quarter-inch from the outer surface of the housing.

Statement 18. The method of statements 11, 12, or 14-16, wherein the extruded boss is a stabilizer.

Statement 19. The method of statement 18, wherein the stabilizer includes one or more channels.

Statement 20. The method of statement 19, wherein the stabilizer is configured to center the instrument section in a wellbore.

It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:
1. A system comprising:
 a measurement assembly, wherein the measurement assembly comprises:
  a housing having a circumference that forms an outer surface;
  a transducer disposed flush along the outer surface of the housing; and an extruded boss having an inner circumference that forms an inner surface which is in contact with the entire circumference of the outer surface of the housing.

2. The system of claim 1, further comprising a sensor disposed on the extruded boss.

3. The system of claim 2, wherein the sensor is configured to detect contact between a wellbore wall and the sensor.

4. The system of claim 1, wherein the extruded boss is connected to the outer surface of the housing no more than two feet above the transducer.

5. The system of claim 4, wherein the extruded boss connects above the transducer.

6. The system of claim 4, wherein the extruded boss connects below the transducer.

7. The system of claim 1, wherein the extruded boss extends at least a quarter-inch from the outer surface of the housing.

8. The system of claim 1, wherein the extruded boss is a stabilizer.

9. The system of claim 8, wherein the stabilizer includes one or more channels.

10. The system of claim 9, wherein the stabilizer is configured to center the measurement assembly in a wellbore.

11. A method comprising:
disposing a downhole tool that includes an instrument section into a wellbore, wherein the instrument section comprises:
a housing having a circumference that forms an outer surface;
a transducer disposed flush along the outer surface of the housing; and
an extruded boss having an inner circumference that forms an inner surface which is in contact with the entire circumference of the outer surface of the housing; and
transmitting an excitation from the transducer into the wellbore, wherein the excitation is reflected off a wellbore wall as an echo.

12. The method of claim 11 further comprising a sensor disposed on the extruded boss.

13. The method of claim 12, wherein the sensor is configured to detect contact between the wellbore wall and the sensor.

14. The method of claim 11, determining an echo velocity with $V_{echo} = D_{min} T_{min} 2$, wherein $D_{min}$ is a distance from the transducer to the wellbore wall and $T_{min}$ is an echo travel time.

15. The method of claim 11, wherein the extruded boss is connected to the outer surface of the housing no more than two feet above the transducer.

16. The method of claim 15, wherein the extruded boss connects above the transducer or below the transducer.

17. The method of claim 11, wherein the extruded boss extends at least a quarter-inch from the outer surface of the housing.

18. The method of claim 11, wherein the extruded boss is a stabilizer.

19. The method of claim 18, wherein the stabilizer includes one or more channels.

20. The method of claim 19, wherein the stabilizer is configured to center the instrument section in a wellbore.

* * * * *